(12) United States Patent
Liu (10) Patent No.: US 8,217,289 B2
(45) Date of Patent: Jul. 10, 2012

(54) KEYBOARD AND KEY STRUCTURE THEREOF

(75) Inventor: Chia-Hung Liu, Hsinchuang (TW)

(73) Assignee: Darfon Electronics Corp., Taoyuan (TW)

( * ) Notice: Subject to any disclaimer, the term of this patent is extended or adjusted under 35 U.S.C. 154(b) by 863 days.

(21) Appl. No.: 12/346,477

(22) Filed: Dec. 30, 2008

(65) Prior Publication Data
US 2009/0174579 A1 Jul. 9, 2009

(30) Foreign Application Priority Data
Jan. 4, 2008 (TW) ................................ 97200222 U (51) Int. Cl.
*H01H 13/70* (2006.01)
(52) U.S. Cl. ........ 200/344; 200/341; 200/345; 400/472; 400/490; 400/495; D14/399; D14/456; D18/12.2
(58) Field of Classification Search .................. 200/341, 200/344, 345; 400/472, 490, 495; D14/399, D14/456; D18/12.2
See application file for complete search history.

(56) References Cited

U.S. PATENT DOCUMENTS

| | | | | |
|---|---|---|---|---|
| 5,947,616 A | * | 9/1999 | Liang | 400/491.2 |
| 6,031,189 A | * | 2/2000 | Watanabe et al. | 200/5 A |
| 6,160,233 A | * | 12/2000 | Hu | 200/344 |
| 6,392,176 B1 | * | 5/2002 | Tsai | 200/344 |
| 6,545,232 B1 | * | 4/2003 | Huo-Lu | 200/5 A |
| 2010/0272490 A1 | * | 10/2010 | Chang | 400/490 |
| 2011/0114461 A1 | * | 5/2011 | Chen | 200/344 |

* cited by examiner

*Primary Examiner* — Timothy Edwards, Jr.

(57) ABSTRACT

A keyboard and key structure thereof includes a keycap, an elastic element, a supporting element, a base and a frame. The elastic element is located below the keycap. The supporting element has a supporting part, a connecting part and an end part, wherein the supporting part supports the keycap and the connecting part connects the supporting part and the end part. The base supports the elastic element. The frame secures the end part on the base. A keyboard includes a plurality of key structures.

16 Claims, 11 Drawing Sheets

KEYBOARD AND KEY STRUCTURE THEREOF

CROSS REFERENCE TO RELATED APPLICATIONS

This Application claims priority of Taiwan Patent Application No. 97200222, filed on Jan. 4, 2008, the entirety of which is incorporated by reference herein.

BACKGROUND OF THE INVENTION

1. Field of the Invention

The invention relates to a key structure and a keyboard thereof with a frame to dispose an end part of a supporting element between the frame and a base.

2. Description of the Related Art

A computer simply processing word in the past is improved to process video, media and video gaming, and has a variety of functions nowadays. Of computer and computer devices, the keyboard is still an integral interface device for computers. The keys on the keyboard represent different functions such that a user presses the keys on the keyboard to transmit signals for controlling the computer.

Figure 1:
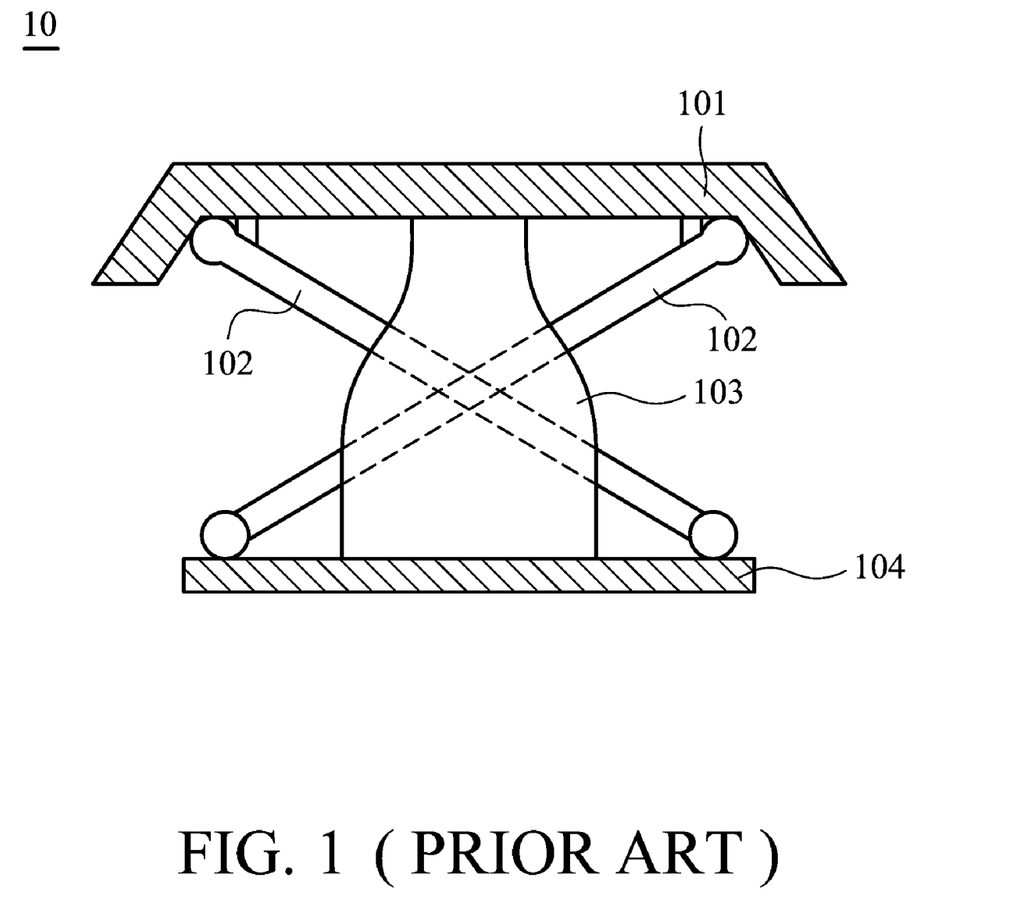
FIG. 1 is a schematic view of a conventional key structure.

FIG. 1 is a schematic view of a conventional key structure. The conventional key structure 10 comprises a keycap 101, two supporting elements 102, an elastic element 103, and a base 104. The above elements are described as following.

The supporting elements 102 support the keycap 101. The elastic element 103 is disposed under the keycap 101, and the base 104 holds the supporting elements 102 and the elastic element 103.

The supporting elements 102 are disposed and pivot on the base 104 between the keycap 101 and base 104 such that the keycap 101 moves upward and downward relative to the base 103.

However, during assembly of the conventional key structure 10, because the supporting elements 102 are disposed and pivots on the base 104 between the keycap 101 and the base 104, when the keycap 101 moves upward and downward relative to the base 103, the supporting elements and the elastic element 103 are exposed and are not covered by an object. Thus, when the keycap 101 moves upward and downward, the supporting elements 102 and the base 103 are easily broken or smudged by solids or exposed to liquids. In addition, because the supporting elements 102 are disposed and pivots on the base 104, manufacturing assembly is not very convenient.

BRIEF SUMMARY OF THE INVENTION

The invention provides a key structure including a keycap, an elastic element, a supporting element, a base and a frame. The elastic element is located below the keycap. The supporting element has a supporting part, a connecting part and an end part. The supporting part supports the keycap and the connecting part connects the supporting part and the end part. The base supports the elastic element. The frame secures the end part on the base.

Note that the frame comprises a groove, and the end part is disposed in the groove.

Note that the base comprises a groove, and the end part is disposed in the groove.

Note that the frame comprises a first groove and the base a second groove, wherein the first groove and the second groove form an accommodating space, and the end part is disposed in the accommodating space.

Note that the base is fixed to the frame via fastening.

Note that the base is fixed to the frame via adhesive.

Note that the frame is a unitary and single member.

Note that the frame is made of plastics.

The invention further provides a keyboard comprising a plurality of keycaps, a plurality of elastic elements, a plurality of supporting elements, a base, and a frame. The elastic elements are disposed under the keycaps. The supporting elements comprise a plurality of supporting parts, a plurality of connecting parts and a plurality of end parts. The supporting parts support the keycaps and the connecting parts are connected to the supporting parts and the end parts. The base supports the elastic elements. The frame secures the end parts on the base.

Note that the frame comprises a plurality of grooves, and the end parts are disposed in the grooves.

Note that the base comprises a plurality of grooves, and the end parts are disposed in the grooves.

Note that the frame comprises a plurality of first grooves and the base a plurality of second grooves, wherein the first grooves and the second grooves form a plurality of accommodating spaces, and the end parts are disposed in the accommodating spaces.

Note that the base is fixed to the frame via fastening.

Note that the base is fixed to the frame via adhesive.

Note that the frame is a unitary and single member.

Note that the frame is made of plastics.

BRIEF DESCRIPTION OF DRAWINGS

The invention can be more fully understood by reading the subsequent detailed description and examples with references made to the accompanying drawings, wherein.

The invention can be more fully understood by reading the subsequent detailed description and examples with references made to the accompanying drawings.

DETAILED DESCRIPTION OF THE INVENTION

Figure 2:
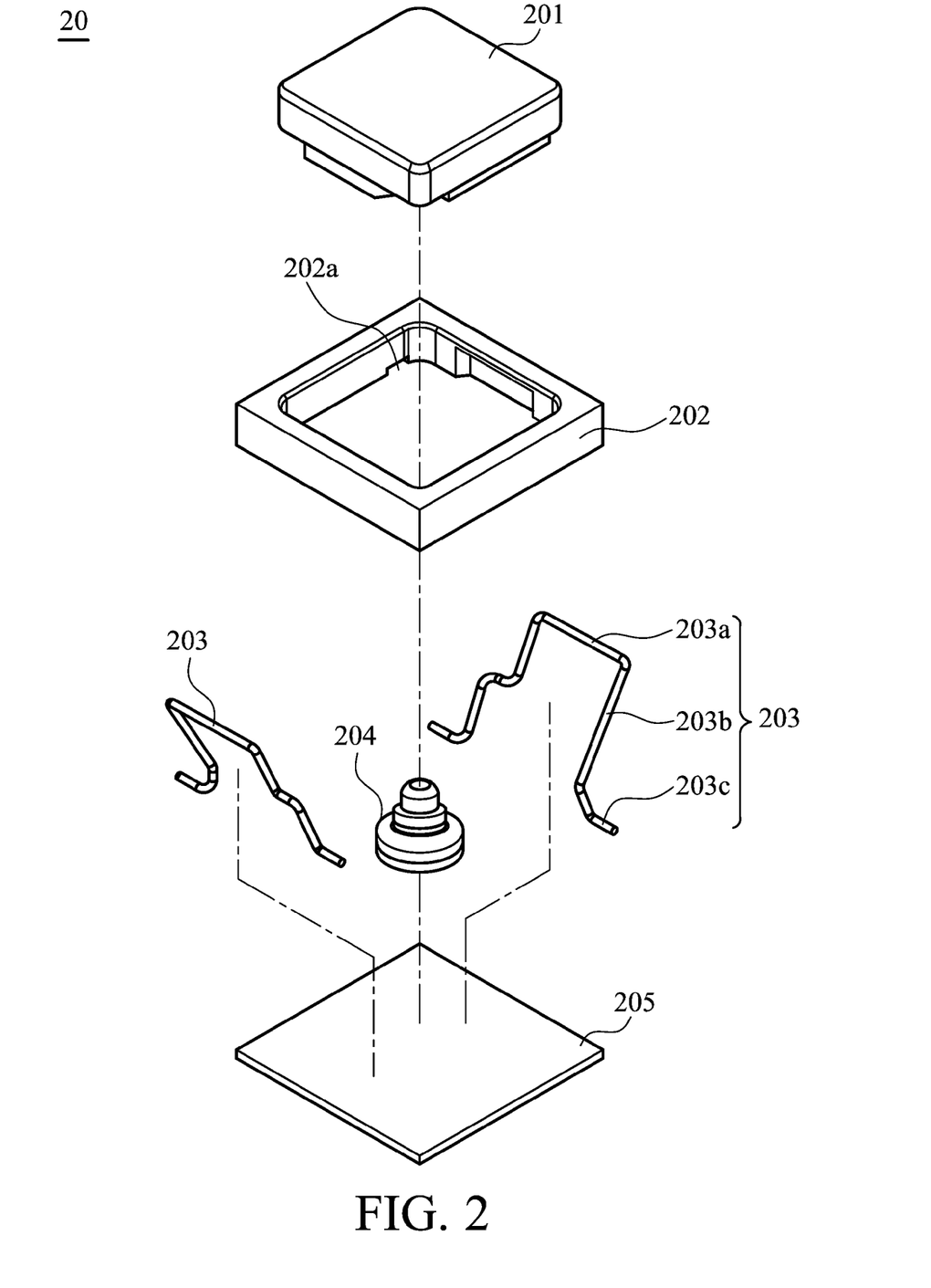
FIG. 2 is an exploded view of an embodiment of a key structure of the invention.
Figure 3:
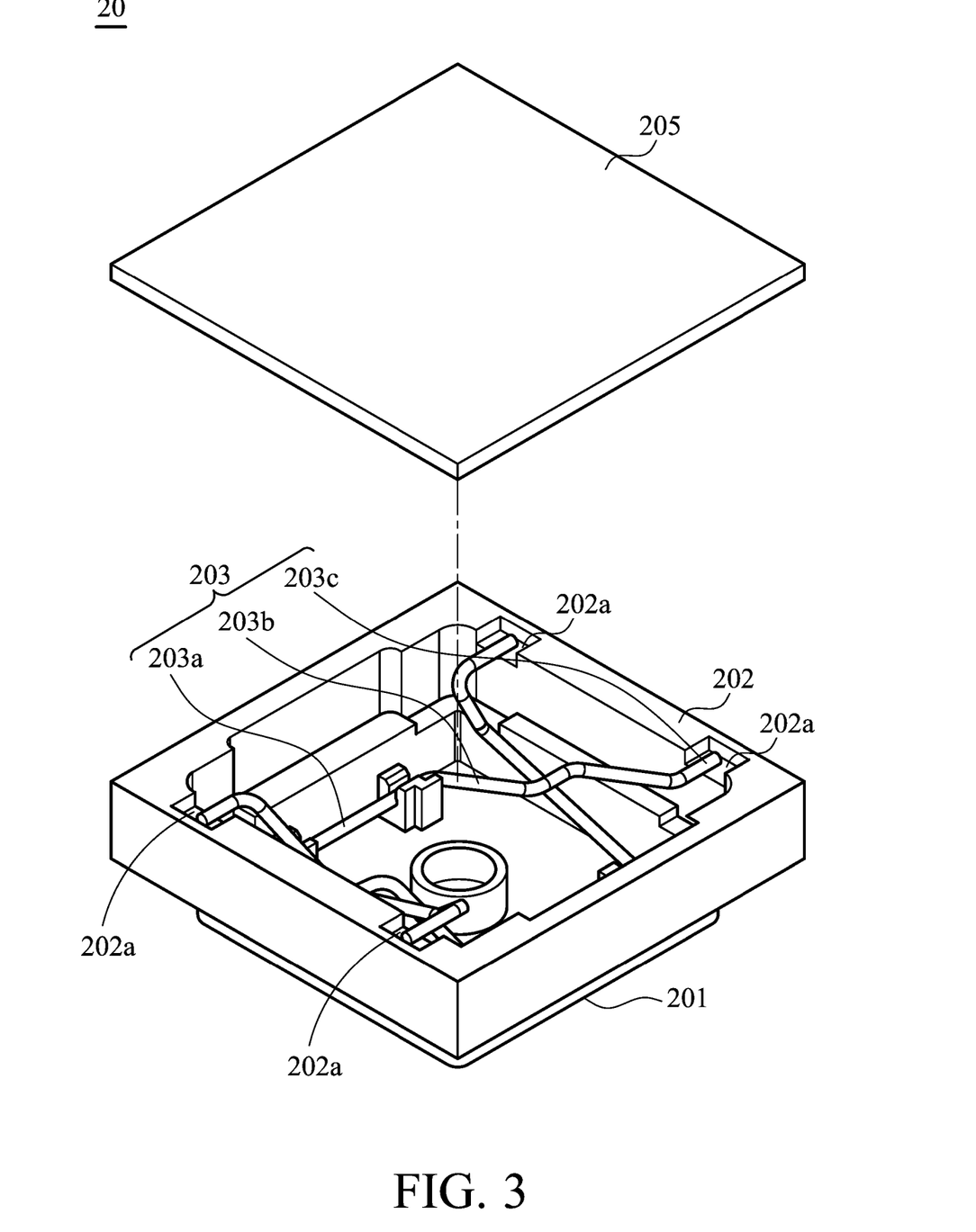
FIG. 3 is a reversed schematic view of the embodiment of the key structure in FIG. 2, showing a base, a supporting element, a frame, and a keycap from bottom to top.
Figure 4:
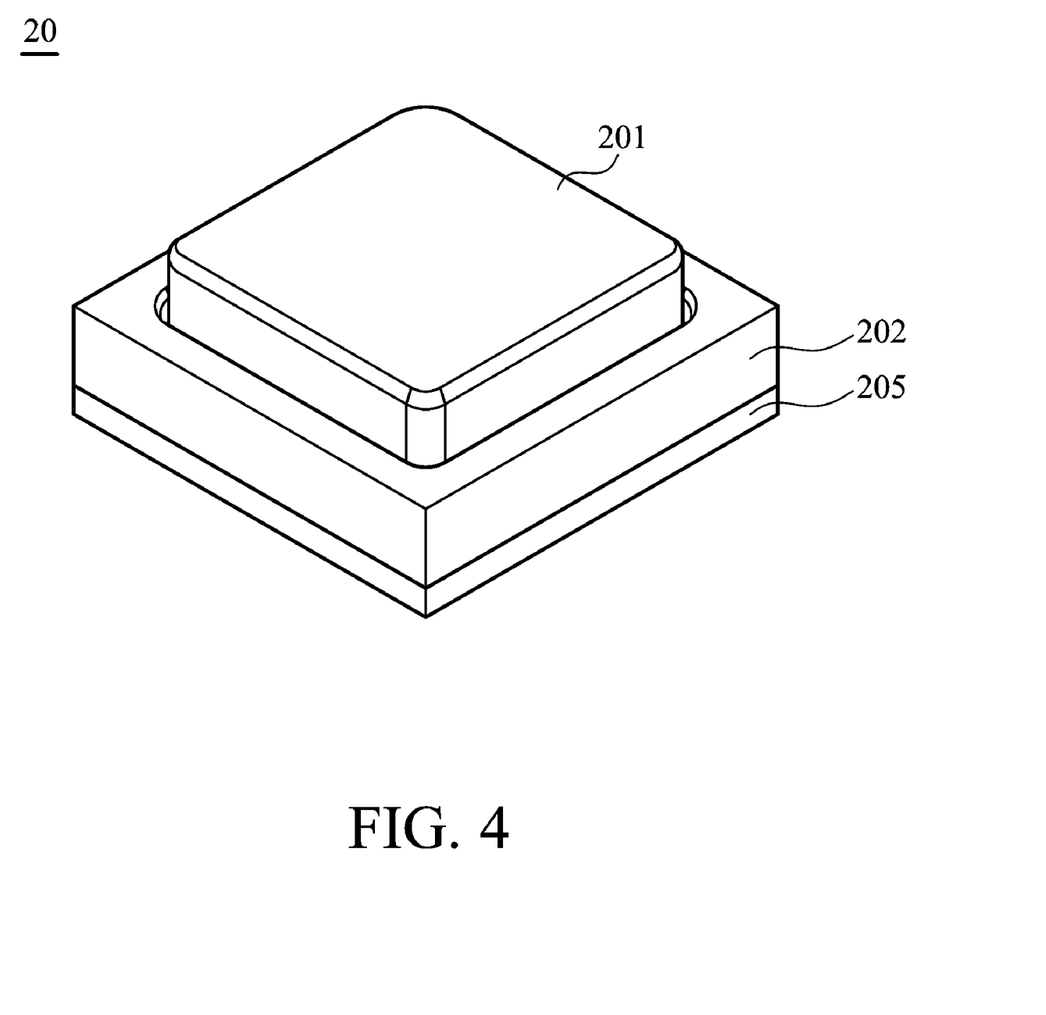
FIG. 4 is a schematic view of an embodiment of a key structure of the invention.

FIG. 2 is an exploded view of an embodiment of a key structure of the invention. FIG. 3 is a reversed schematic view of the embodiment of the key structure in FIG. 2, showing a base, a supporting element, a frame, and a keycap from bottom to top. FIG. 4 is a schematic view of an embodiment of a key structure of the invention. Please refer to FIGS. 2, 3, and 4, in this embodiment, the key structure 20 comprises a keycap 201, a frame 202, two supporting elements 203, an elastic element 204, and a base 205. The above elements are described as follows.

The base 205 simultaneously supports the frame 202, the supporting elements 203, and the elastic element 204. The base 205 and the frame 202 are fixed via fastening or adhesion. The frame 202 comprises a groove 202a thereunder. The frame 202 is made of plastics and is a unitary and single member.

The supporting element 203 has a supporting part 203a, a connecting part 203b and an end part 203c.

The supporting part 203a of the supporting element 203 supports the keycap 201. The elastic element 204 is disposed under the keycap 201. The end part 203c of the supporting element 203 is installed in the groove 202a of the frame 202.

The end part 203c of the supporting element 203 slides or rotates in the groove 202a of the frame 202 such that the keycap 201 moves upward and downward relative to the base 205. The steps to assemble the key structure 20 of the invention are first, to install the end part 203c of the supporting element 203 in the groove 202a of the frame 202. Next, the end part 203c of the supporting element 203 is secured between the base 205 and the frame 202 (in the groove 202a) via the base 205, supporting the supporting element 203, the frame 202 and the elastic element 204. When the keycap 201 moves upward and downward relative to the base 205, the supporting element 203 and the elastic element 204 are covered by the frame 202 to prevent the supporting element 203 and the elastic element 204 from damage and pollutants. By directly installing the end part 203c of the supporting element 203 in the groove 202a, the assembly and manufacturing of the key structure of the invention is simplified, thus improving manufacturing efficiency, decreasing assembly and manufacturing time, and decreasing costs.

Figure 5:
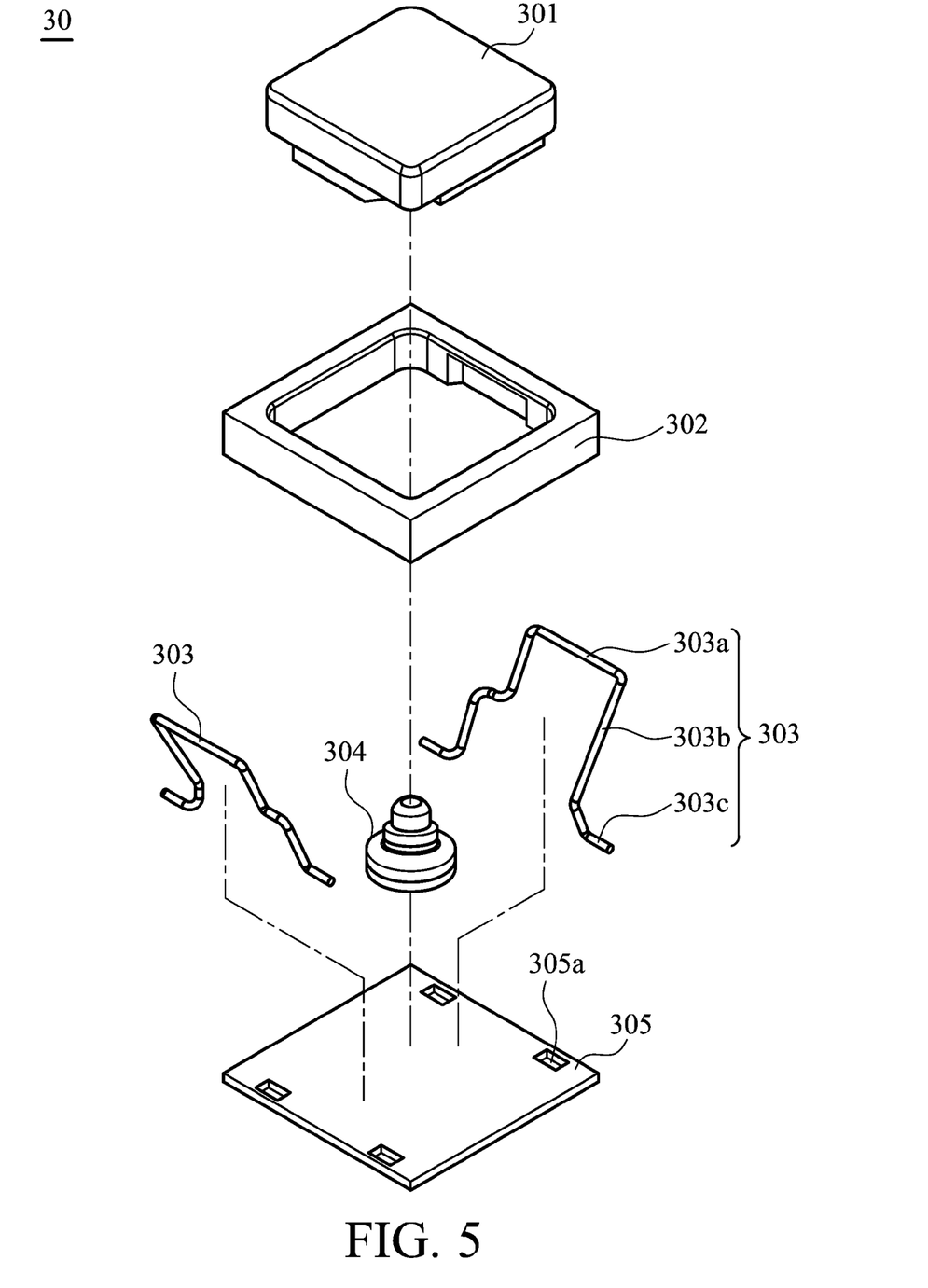
FIG. 5 is a schematic view of another embodiment of a key structure of the invention.
Figure 6:
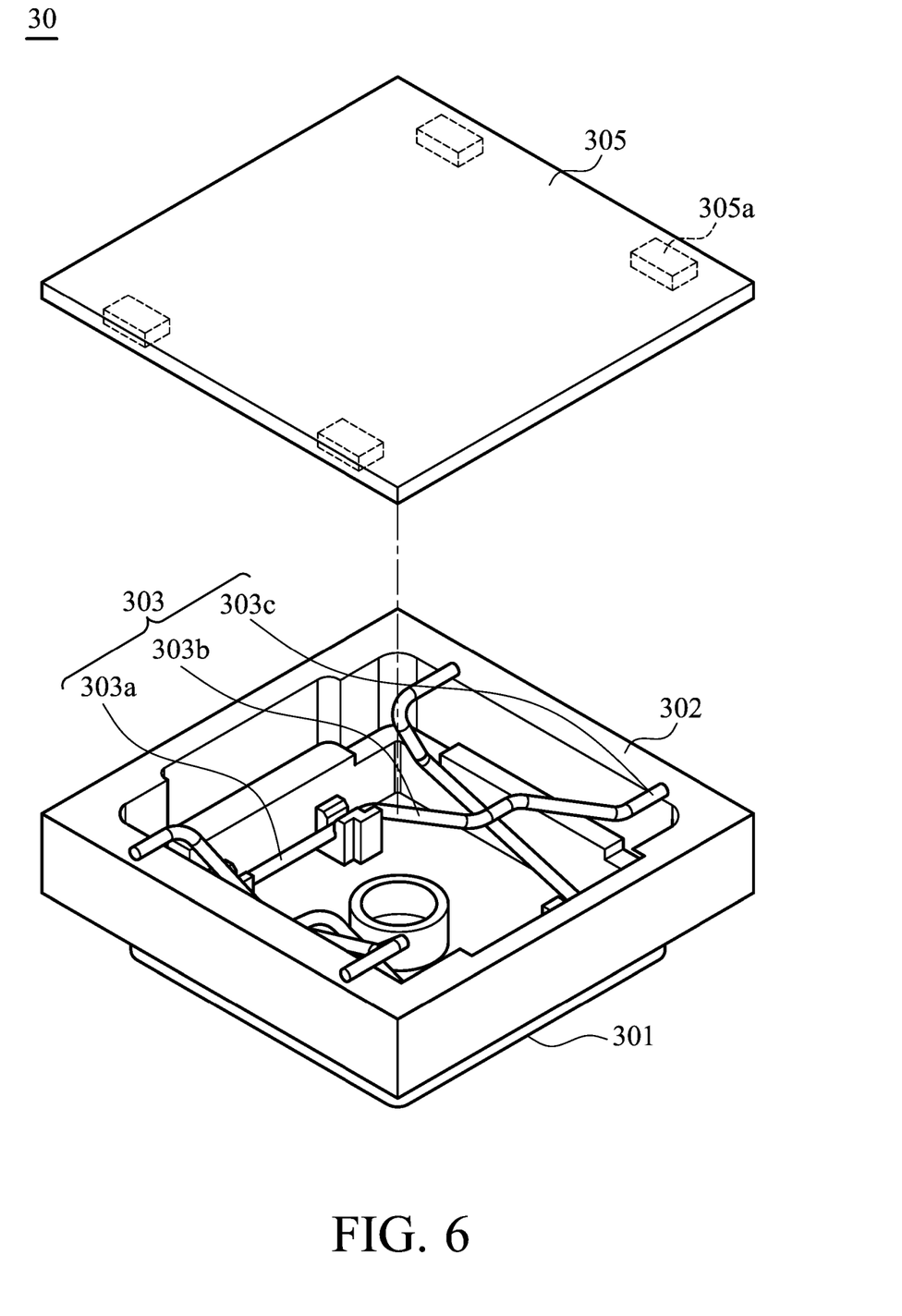
FIG. 6 is a reversed schematic view of the embodiment of a key structure of the invention in FIG. 5, showing a base, a supporting element, a frame, and a keycap from bottom to top.

FIG. 5 is a schematic view of another embodiment of a key structure of the invention. FIG. 6 is a reversed schematic view of the embodiment of a key structure of the invention in FIG. 5, showing a base, a supporting element, a frame, and a keycap from bottom to top. Please refer to FIGS. 5 and 6, in this embodiment, the key structure 30 comprises a keycap 301, a frame 302, two supporting elements 303, an elastic element 304, and a base 305. The above elements are described as follows.

The base 305 simultaneously supports the frame 302, the supporting elements 303, and the elastic element 304. The base 305 and the frame 302 are fixed via fastening or adhesion. The frame 302 is made of plastics and is a unitary and single member. The base 305 comprises a groove 305a thereunder.

The supporting element 303 has a supporting part 303a, a connecting part 303b and an end part 303c. The connecting part 303b is connected to the supporting part 303a and the end part 303c.

The supporting part 303a supports the keycap 301. The elastic element 304 is disposed under the keycap 301. The end part 303c of the supporting element 303 is installed in the groove 305a of the base 305.

The end part 303c of the supporting element 303 slides or rotates in the groove 305a of the base 305 such that the keycap 301 moves upward and downward relative to the base 305. The steps to assemble the key structure 30 of the invention are first, to install the end part 303c of the supporting element 303 in the groove 305a of the base 305. Next, the end part 303c of the supporting element 303 is secured between the base 305 and the frame 302 (in the groove 305a) via the base 305, supporting the supporting element 303, the frame 302 and the elastic element 304. When the keycap 301 moves upward and downward relative to the base 305, the supporting element 303 and the elastic element 304 are covered by the frame 302 to prevent the supporting element 303 and the elastic element 304 from damage and pollutants. By directly installing the end part 303c of the supporting element 303 in the groove 305a, the assembly and manufacturing of the key structure of the invention is simplified, thus improving manufacturing efficiency, decreasing assembly and manufacturing time, and decreasing costs.

Figure 7:
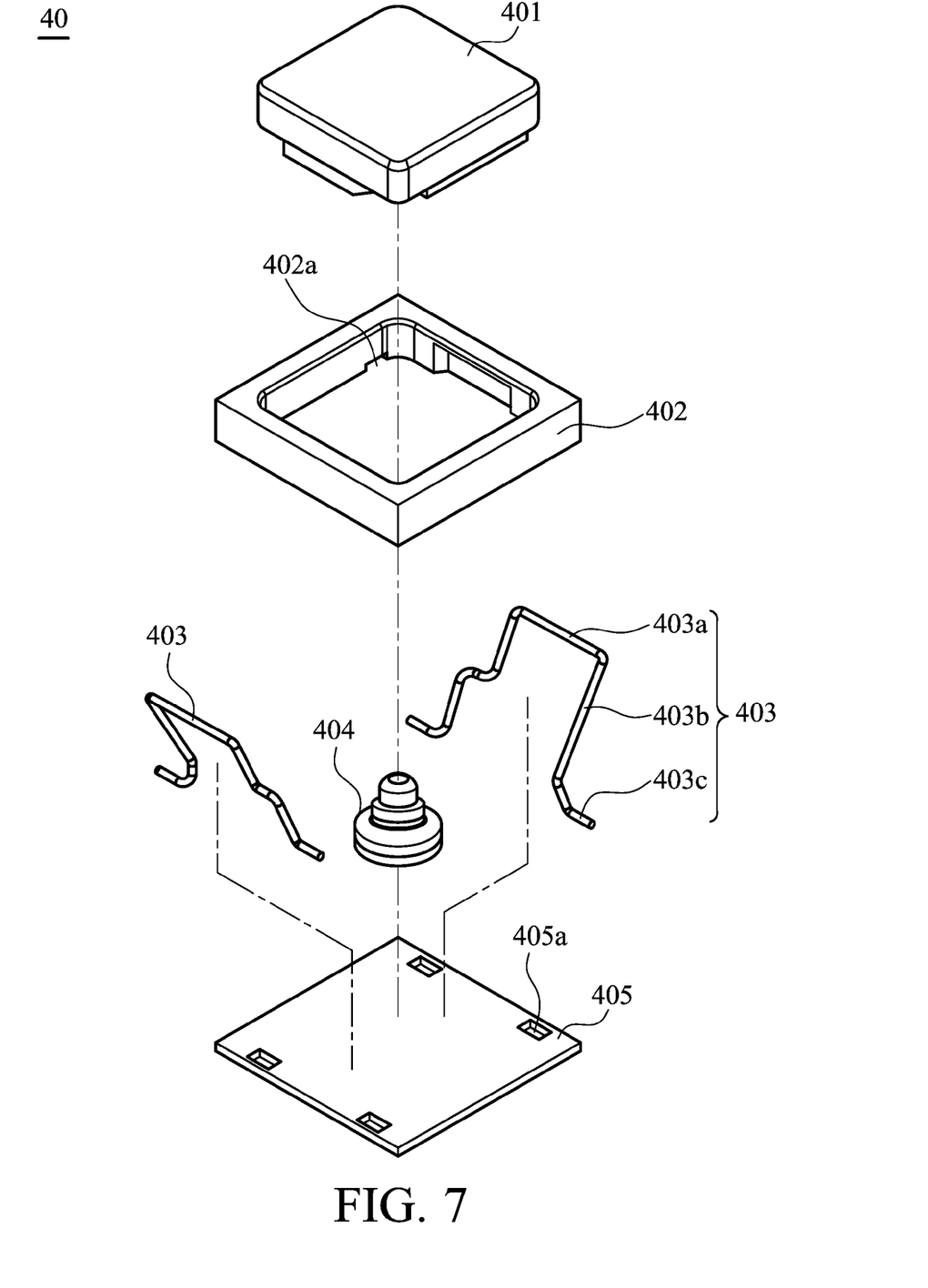
FIG. 7 is an exploded view of another embodiment of a key structure of the invention.
Figure 8:
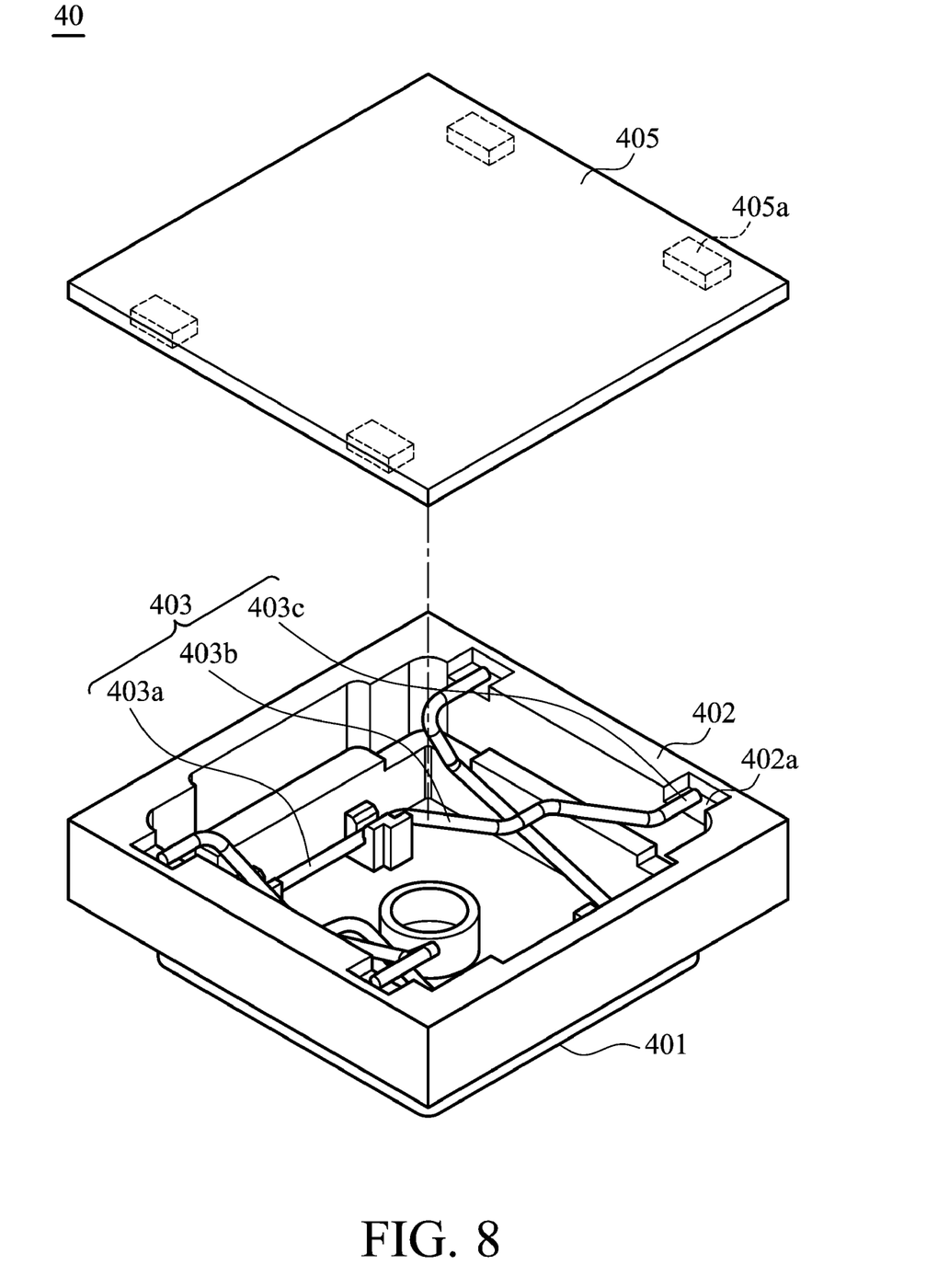
FIG. 8 is a reversed schematic view of the embodiment of a key structure of the invention in FIG. 7, showing a base, a supporting element, a frame, and a keycap from bottom to top.
Figure 9:
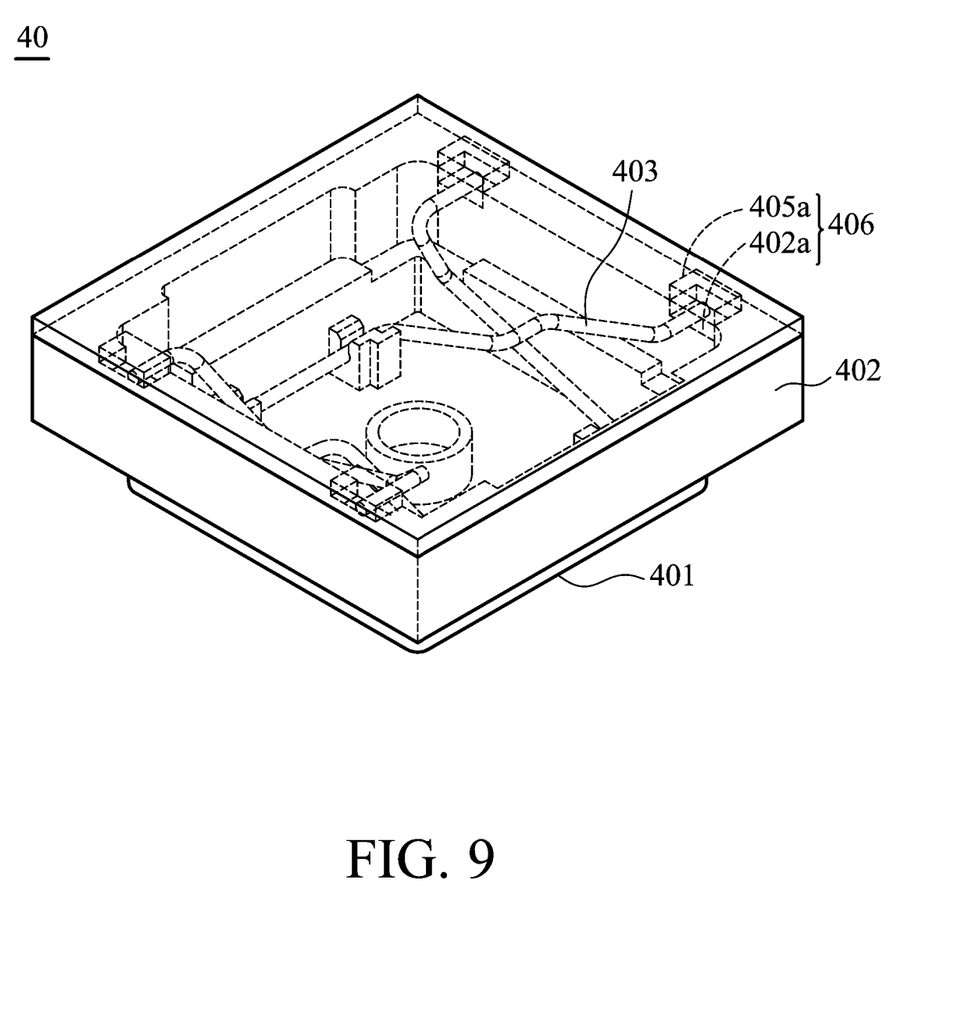
FIG. 9 is a schematic view of another embodiment of a key structure of the invention.

FIG. 7 is an exploded view of another embodiment of a key structure of the invention. FIG. 8 is a reversed schematic view of the embodiment of a key structure of the invention in FIG. 7, showing a base, a supporting element, a frame, and a keycap from bottom to top. FIG. 9 is a schematic view of another embodiment of a key structure of the invention. Please refer to FIGS. 7, 8 and 9, in this embodiment, the key structure 40 comprises a keycap 401, a frame 402, two supporting elements 403, an elastic element 404, and a base 405. The above elements are described as follows.

The base 405 simultaneously supports the frame 402, the supporting elements 403, and the elastic element 404. The base 405 and the frame 402 are fixed via fastening or adhesion. The frame 402 comprises a first groove 402a thereunder. The base 405 comprises a second groove 405a thereover. The first groove 402a and the second groove 405a form an accommodating space 406 (shown in FIG. 9). The frame 402 is made of plastics and is a unitary and single member.

The supporting element 403 has a supporting part 403a, a connecting part 403b and an end part 403c.

The supporting part 403a of the supporting element 403 supports the keycap 401. The elastic element 404 is disposed under the keycap 401. The end part 403c of the supporting element 403 is installed in the accommodating space 406.

The supporting part 403c of the supporting element 403 slides or rotates in the accommodating space 406 such that the keycap 401 moves upward and downward relative to the base 405. The steps to assemble the key structure 40 of the invention are first, to install the end part 403c of the supporting element 403 in the accommodating space 406. Next, the end part 403c of the supporting element 403 is secured between the base 405 and the frame 402 (in the accommodating space 406) via the base 405, supporting the supporting element 403, the frame 402 and the elastic element 404. When the keycap 401 moves upward and downward relative to the base 405, the supporting element 403 and the elastic element 404 are covered by the frame 402 to prevent the supporting element 403 and the elastic element 404 from damage and pollutants. By directly installing the end part 403c of the supporting element 403 in the accommodating space 406, the assembly and manufacturing of the key structure of the invention is simplified, thus improving manufacturing efficiency, decreasing assembly and manufacturing time, and decreasing costs.

Figure 10:
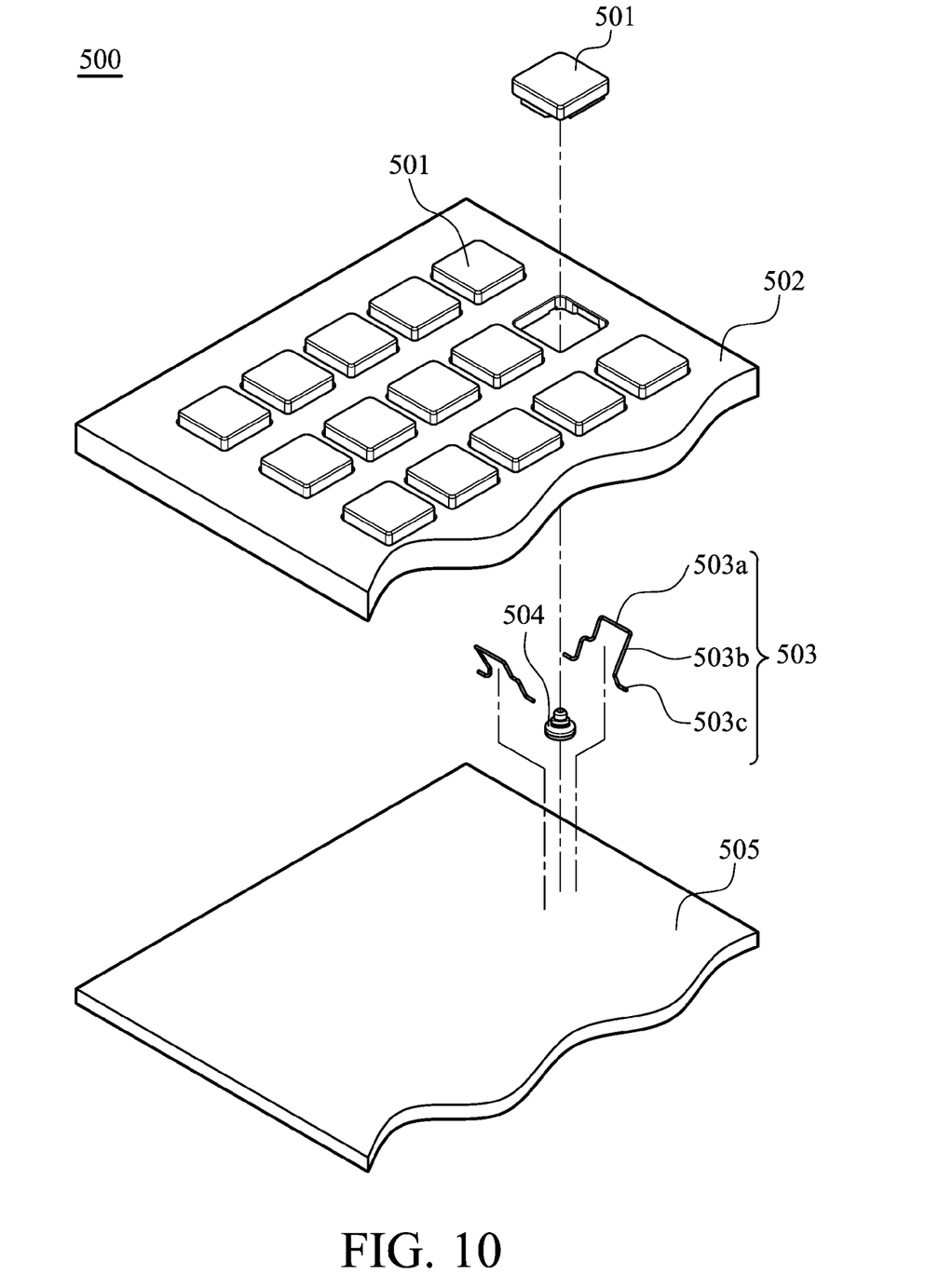
FIG. 10 is a schematic view of an embodiment of a keyboard of the invention.
Figure 11:
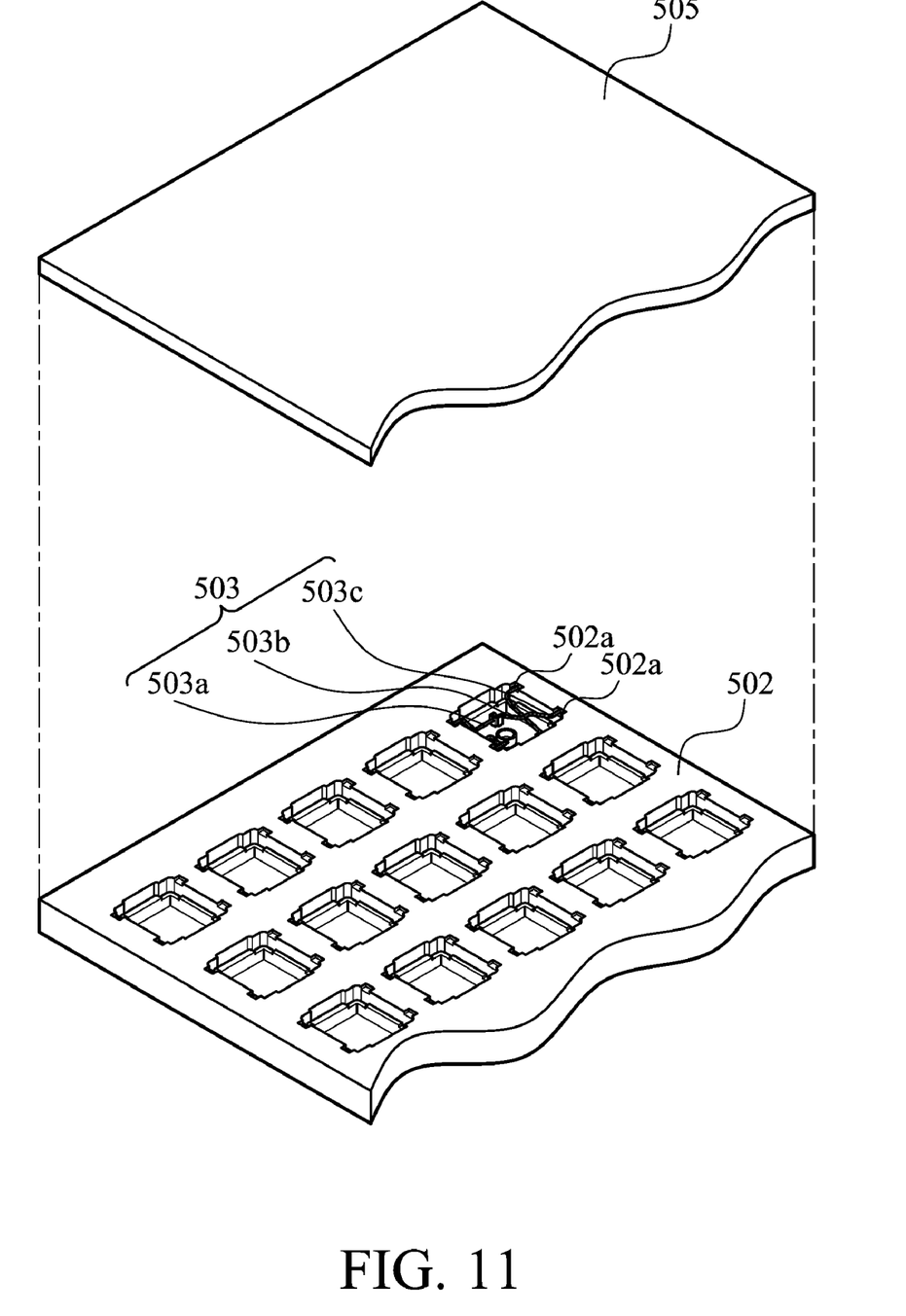
FIG. 11 is a reversed schematic view of the embodiment of the keyboard of the invention in FIG. 10, showing a base and a frame from bottom to top.

FIG. 10 is a schematic view of an embodiment of a keyboard of the invention. FIG. 11 is a reversed schematic view of the embodiment of the keyboard of the invention in FIG. 10, showing a base and a frame from bottom to top. Please refer to FIGS. 10 and 11, in this embodiment, the keyboard 500 comprises a plurality of keycaps 501, a frame 502, a plurality of supporting elements 503, a plurality of elastic elements 504, and a base 505. The above elements are described as follows.

The base 505 simultaneously supports the frame 502, the supporting elements 503, and the elastic elements 504. The base 505 and the frame 502 are fixed via fastening or adhesion. The frame 502 comprises a plurality of grooves 502a thereunder. The frame 502 is made of plastics and is a unitary and single member.

Each supporting element 503 has a supporting part 503a, a connecting part 503b and an end part 503c.

The supporting part 503a of the supporting element 503 supports the keycap 501. The elastic element 504 is disposed under the keycap 501. The end part 503c of the supporting element 503 is installed in the groove 502a of the frame 502.

The end part 503c of the supporting element 503 slides or rotates in the groove 502a of the frame 502 such that the keycap 501 moves upward and downward relative to the base 505.

The steps to assemble the keyboard 500 of the invention are first to install the end part 503c of the supporting element 503 in the groove 502a of the frame 502. Next, the end part 503c of the supporting element 503 is secured between the base 505 and the frame 502 (in the groove 502a) via the base 505 supporting the supporting element 503, the frame 502 and the elastic element 504. When the keycap 501 moves upward and downward relative to the base 505, the supporting element 503 and the elastic element 504 are covered by the frame 502 to prevent the supporting element 503 and the elastic element 504 from damage and pollutants. By directly installing the end part 503c of the supporting element 503 in the groove 502a, the assembly and manufacturing of the keyboard of the invention is simplified, thus improving manufacturing efficiency, decreasing assembly and manufacturing time, and decreasing costs.

In addition, the grooves of the keyboard of the invention can be installed on the top of the base (as shown in FIGS. 5 and 6) such that the end part of the supporting element is installed in the groove to secure the end part between the base and the frame. Or, the frame of the keyboard can comprise a plurality of first grooves on the bottom thereof and the base of the keyboard can comprise a plurality of second grooves on the top thereof. The first grooves and the second grooves can form a plurality of accommodating spaces (as shown in FIGS. 7 and 8) such that the end part of the supporting element can be installed in the accommodating space to secure the end part between the base and the frame.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A key structure, comprising:
   a keycap;
   an elastic element, disposed under the keycap;
   a supporting element, having a supporting part, a connecting part and an end part, wherein the supporting part supports the keycap and the connecting part is connected to the supporting part and the end part;
   a base, supporting the elastic element; and
   a frame, securing the end part on the base.

2. The key structure as claimed in claim 1, wherein the frame comprises a groove, and the end part is disposed in the groove.

3. The key structure as claimed in claim 1, wherein the base comprises a groove, and the end part is disposed in the groove.

4. The key structure as claimed in claim 1, wherein the frame comprises a first groove, the base comprises a second groove, the first groove and the second groove form an accommodating space, and the end part is disposed in the accommodating space.

5. The key structure as claimed in claim 1, wherein the base is fixed to the frame via fastening.

6. The key structure as claimed in claim 1, wherein the base is fixed to the frame via adhesion.

7. The key structure as claimed in claim 1, wherein the frame is a unitary and single member.

8. The key structure as claimed in claim 1, wherein the frame is made of plastics.

9. A keyboard, comprising:
   a plurality of keycaps;
   a plurality of elastic elements, disposed under the keycaps;
   a plurality of supporting elements, having a plurality of supporting parts, a plurality of connecting parts and a plurality of end parts, wherein the supporting parts support the keycaps and the connecting parts are connected to the supporting parts and the end parts;
   a base, supporting the elastic elements; and
   a frame, securing the end parts on the base.

10. The keyboard as claimed in claim 9, wherein the frame comprises a plurality of grooves, and the end parts are disposed in the grooves.

11. The keyboard as claimed in claim 9, wherein the base comprises a plurality of grooves, and the end parts are disposed in the grooves.

12. The keyboard as claimed in claim 9, wherein the frame comprises a plurality of first grooves, the base comprises a plurality of second grooves, the first grooves and the second grooves form a plurality of accommodating spaces, and the end parts are disposed in the accommodating spaces.

13. The keyboard as claimed in claim 9, wherein the base is fixed to the frame via fastening.

14. The keyboard as claimed in claim 9, wherein the base is fixed to the frame via adhesion.

15. The keyboard as claimed in claim 9, wherein the frame is a unitary and single member.

16. The keyboard as claimed in claim 9, wherein the frame is made of plastics.

* * * * *